June 30, 1953  R. TURNER  2,643,526
PRODUCTION OF ICE-CREAM BLOCKS
Filed Jan. 14, 1948  3 Sheets-Sheet 3
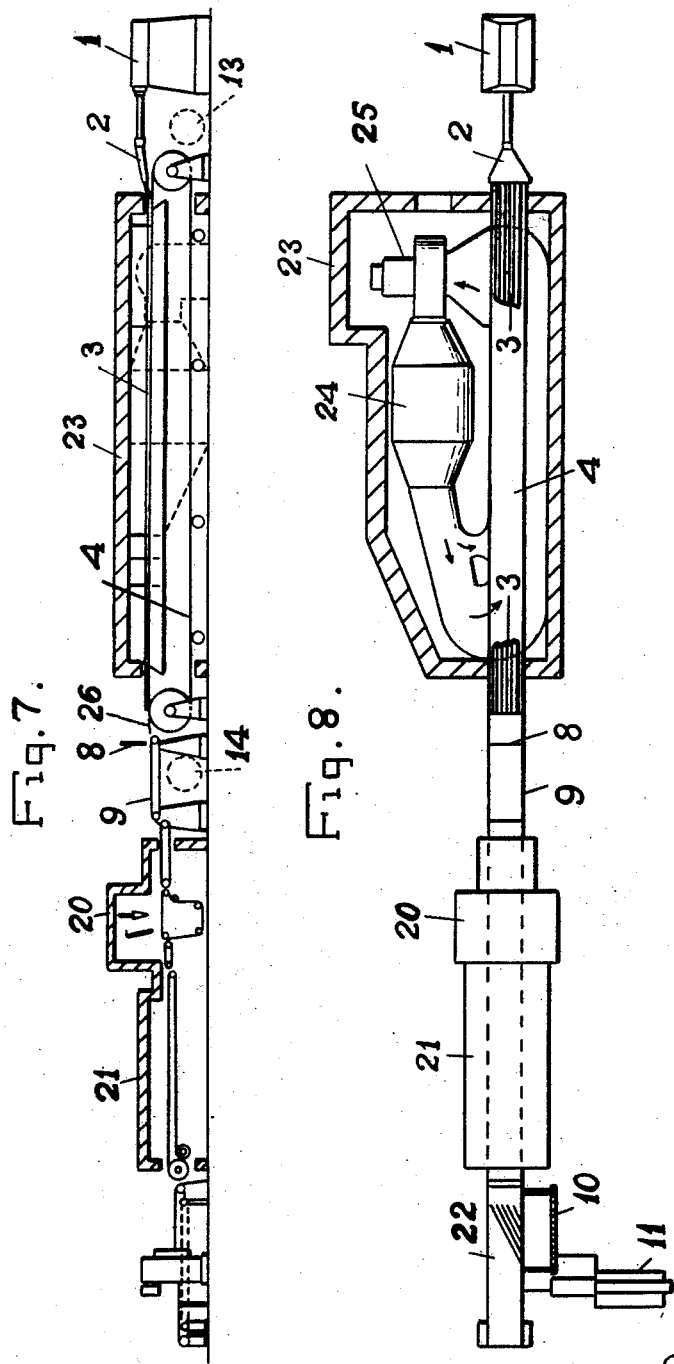
Inventor:
Reginald Turner,
By: Pierce, Scheffler & Parker,
Attorneys.

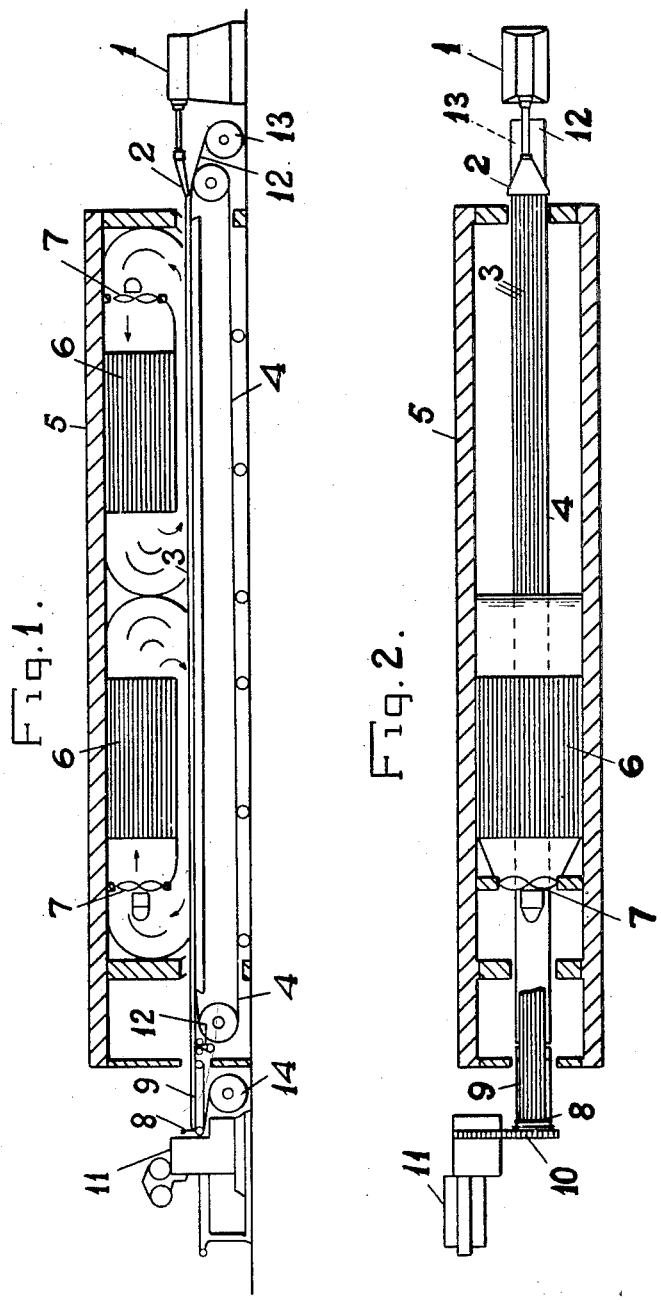

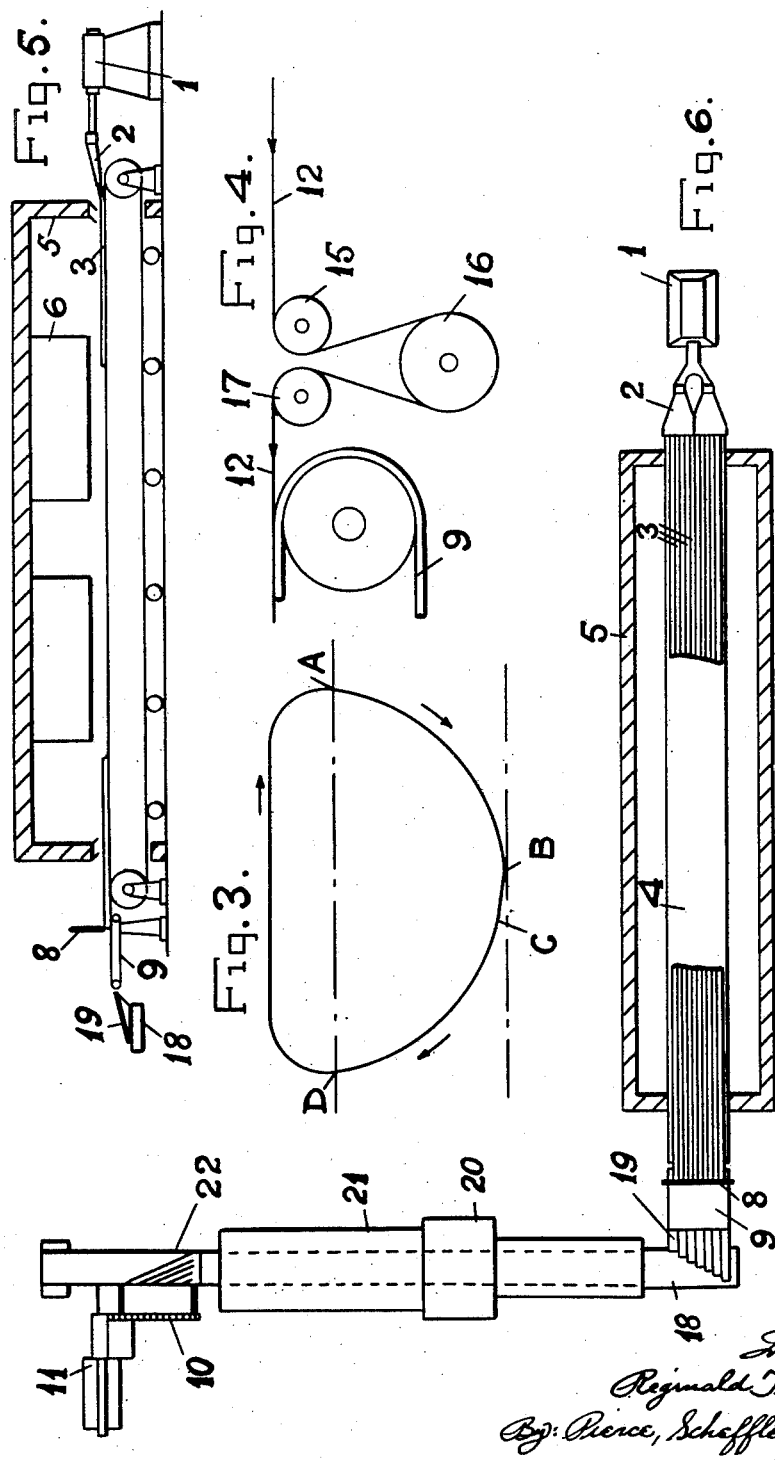

Patented June 30, 1953

2,643,526

UNITED STATES PATENT OFFICE 2,643,526

PRODUCTION OF ICE-CREAM BLOCKS

Reginald Turner, Horsforth, near Leeds, England

Application January 14, 1948, Serial No. 2,346
In Great Britain January 14, 1947

7 Claims. (Cl. 62—114)

This invention relates to the production of ice cream blocks which are usually passed to a wrapping machine to be wrapped in grease proof paper, foil or other material. In some cases the blocks are coated with chocolate or other material and sold with or without a wrapping.

According to the method at present in use, ingredients are introduced into freezing apparatus where aeration takes place and the ice cream is extruded through one or more nozzles in a semi-plastic state on to sheets of grease-proof paper resting on a tray or other carrier, which is synchronised with the extruder. The ice cream is extruded in the form of continuous ribbons or strips, which are severed by means of a guillotine knife or other means into elongated slabs. The deposited slabs which are very soft, and unfit at this stage for wrapping, are lifted by hand on their trays or carriers into a cold tunnel or other freezing apparatus, through which they are carried by a belt or chain conveyor. The frozen slabs are then transported to a cutting and wrapping machine where the paper on which they are laid must be removed by hand before passing through the cutting and wrapping operation. Due to this manual transportation and the time lag which elapses between the freezing and wrapping operation, the slabs must be frozen more than is actually required and invariably pass through a tempering operation immediately prior to the actual wrapping operation. Moreover, due to the condition of the ice cream when the slabs are deposited, the two ends of each slab are usually deformed and must be cut off to become waste before the actual wrapping takes place. The main disadvantage of the method is that the process is not continuous, with consequent loss of time between the slab production and wrapping of the cut blocks, and there is a very high waste proportion. Also extra scrap is made due to too hard or too soft slabs which have to be hardened or tempered to allow for time lags in feeding to the wrapping machines. Also the paper carried has to be stripped by hand from each slab and such plant is not very suitable for sterilisation and due to handling the hygienic conditions are not all they might be.

The main object of this invention is to improve the production of ice cream blocks to be wrapped and/or coated.

Accordingly a method of producing ice cream blocks consists in extruding a continuous strip or strips of semi-plastic ice cream on to conveyor means which carry the strip or strips through freezing apparatus and to cutting means which sever a hardened strip at required intervals to form ice cream blocks which are fed to a wrapping and/or coating or other machine. The strips of ice cream may be deposited direct on to an endless band capable of being sterilized or on to a paper or like carrier which is stripped automatically from beneath a strip prior to it being cut into ice cream blocks. The paper may be fed from a roll over the face of a conveyor on to a receiving roll travelling at the same speed as the conveyor. Alternatively, the paper may be in the form of an endless band. The path of the paper may be such that it is stripped automatically from beneath the strip or strips of ice cream.

Referring now to the accompanying drawing in which embodiments of the invention are shown—

Fig. 1 is a part sectional side elevation of apparatus according to the invention;

Fig. 2 is a part sectional plan of the apparatus;

Fig. 3 is a diagram of the knife motion;

Fig. 4 is a detail arrangement of the flexible carrier stripping device;

Fig. 5 is a part sectional side elevation of a modified apparatus;

Fig. 6 is a part sectional plan of Fig. 5;

Fig. 7 is a part sectional side elevation of a further modified apparatus;

Fig. 8 is a part sectional plan of Fig. 7.

In a particular embodiment of this invention shown in Figs. 1 to 4, ice cream mixing, partial freezing and extruding apparatus 1 of known construction is adapted to supply a desired number of streams of semi-plastic ice cream through rectangular extrusion jets 2 and deposit such streams in the form of continuous strips 3 of the required cross sectional area on to an endless conveyor band 4. This conveys the strips of ice cream through a so-called tunnel or equivalent freezing apparatus 5 which hardens the ice cream by reducing the temperature to the required degree for cutting and wrapping, coating or other purposes. The freezing apparatus 5 shown comprises a tunnel, housing evaporator units 6 (with ammonia or other medium in tubes) and fans 7 for circulating cold air over and round the strips. Continuous strips are fed from the freezing apparatus to cutting means comprising a transverse guillotine 8 adapted for cutting off rectangular blocks of ice cream. Such guillotine may be arranged at the end of the said conveyor 4 or, as shown the strips of ice cream are fed on to an additional conveyor 9 (or cutting table) for the cutting operation. The blocks when cut are taken away by conveyor means 10 arranged at a right angle to the continuous strips and adapted to travel at a higher speed than the strip conveyor. The conveyor 10 is shown feeding into a known form of wrapping machine 11 but could feed to a coating or other machine. The guillotine is given a substantially rectangular or other controlled motion so that as each block is cut from the strip it is pushed forwardly away from the strip after which the knife rises and retracts for another cutting operation. This insures that each block is severed cleanly from the strip. In Fig. 3 a diagram of a suitable motion is shown wherein A indicates the position of the knife edge immediately before entering a strip. A—B shows the cutting stroke which moves in unison with the strip. B—C is the pushing stroke which is slightly quicker in action. C—D is the upward stroke reverse to the downward, and from D—A is the lifting (to clear) retracting and start of the downward strokes.

The conveyor 4 for carrying the continuous strips through the freezing apparatus may be made of stainless metal, rubber covered or specially prepared fabric, or the like so that it can be sterilized easily at required intervals and/or, to increase the hygienic conditions of manufacture, a continuous strip or sheet 12 of paper (say wax paper) or prepared fabric can be fed from a roll 13 over the face of the conveyor to a receiving roll 14 travelling at the same speed as that of the conveyor. Thus the strips of ice cream would be deposited on to such paper surface which carries it through the freezing apparatus and is then stripped from beneath the ice cream strips. Any convenient stripping device may be employed and a suitable arrangement more particularly shown in Fig. 4 consists in leading the paper down suddenly over a small diameter roller 15 to beneath another larger roller 16 and up over one (or more) other guide roller 17 over the conveyor 9 and down to the receiving roller. In this manner a small gap can be formed over which the strips of ice cream ride, and the paper carrier is stripped in a very easy and simple manner from underneath the strips of ice cream which then ride over the gap to lie freely on the paper (travelling with the conveyor 9) to be cut. If desired the paper need not be carried over the conveyor 9 and the strips are then fed on to the additional conveying or cutting table. When paper is used as a carrier in this manner sterilization may be carried out at comparatively lengthy intervals, and moreover if so desired paper may be used more than once by transferring the receiving roll to the feeding position. Alternatively, an endless band of paper or prepared fabric can be arranged on the conveyor band 4 or in place thereof. If desired the paper, fabric or other material, and the band may be sterilized whilst running.

In a modification, the strip conveyor 4 or the cutting conveyor 9 (or table) may be on a higher level than the block conveyor 18 arranged at right angles thereto so that severed blocks may drop either by gravity, by controlled path or be carried down on to the block conveyor. In Figs. 5 and 6 the conveyor 9 delivers cut blocks spaced by the action of the cutter on to an inclined guide plate 19 having a stepped lower edge so that the blocks are spaced automatically in rows on the conveyor 18. In this arrangement the blocks are conveyed through a chocolate (or other) coating machine 20 (with attendant hardening tunnel 21) and then fed laterally from conveyor 22 to be fed by conveyor 10 into a wrapping machine 11.

In Figs. 7 and 8 the apparatus includes a modified form of freezing apparatus 23 for the strips with an evaporator unit 24 and blower means 25 arranged at the side of the conveyor band 4. The paper carrier is dispensed with but could be used as indicated by the dotted rolls 13 and 14. Or an endless carrier band may be associated with the band 4 as aforesaid. The frozen strips are stripped from the band 4 by a slightly inclined combined knife and guide plate 26 leading on to the cutting conveyor band 9. The knife 8 has a similar motion to that illustrated in Fig. 3 to space the block. The severed and spaced blocks are then conveyed through a chocolate (or other) coating machine 20 and hardening tunnel 21. All these parts are in longitudinal alignment together with conveyor band 22 from which the blocks are fed laterally to conveyor 10 leading to the wrapping machine 11.

The block conveyor arranged at the end of the continuous strips in conjunction with the cutter 8 feeds the cut blocks direct to wrapping and coating machines and in this manner ice cream can be produced without being handled in any manner. Moreover, the temperature of the ice cream need only be reduced to the required degree of temperature for cutting and wrapping or coating purposes. It will readily be understood only one strip of ice cream need be extruded although several strips can be just as easily extruded to speed up production. Also, if the blocks are removed at right angles to the strips the ends of the blocks being hard, and not newly cut faces can generally contact one another without fear of adhesion. The ice cream blocks are usually of oblong formation and the strip section may be such that the length of a block may be transverse to a strip or longitudinal thereof as desired.

It will be understood a flexible paper or other carrier band may be run from a feed roll on to a receiving roll over a stationary support to convey a strip or strips through a freezing tunnel.

With the above arrangement the hitherto required excessive floor space for tempering, handling, transport and distribution of the slabs can be obviated.

What I claim and desire to secure by Letters Patent is:

1. A method of producing ice cream blocks comprising in sequence the steps of continuously extruding at least one continuous strip of ice cream which is sufficiently firm to retain its shape but not sufficiently hard to withstand handling on to a continuously moving flat supporting surface; hardening the strip and freezing the same on to said supporting surface by continuously moving said strip together with said supporting surface through a freezing chamber and exposing said strip therein on all sides excepting the side in contact with the supporting surface to contact with cold air, continuously breaking the resulting bond between the strip and the supporting surface, continuously delivering the separated strip to a cutting zone and therein severing the strip into successive blocks and imparting to the severed blocks an accelerated motion with respect to the rate of motion of the strip, and delivering the severed blocks in spaced relation on to a conveyor.

2. A method as defined in claim 1 in which the bond between the supporting surface and the strip is broken by continuing the movement of the strip in a substantially rectilinear path while diverting the path of the surface, and delivering the separated strip to a conveyor.

3. A method as defined in claim 1 in which the bond between the strip and the supporting surface is broken by continuing the movement of the strip on a substantially rectilinear path while diverting the path of the surface and delivering the separated strip together with the separated surface to a conveyor.

4. Apparatus for the production of ice cream blocks comprising a first conveyor providing a continuously moving span of flat supporting surface, means for continuously extruding a strip of semi-plastic ice cream on to said surface, a freezing chamber enclosing at least a part of said span, means for circulating cold air in contact with said strip within said freezing chamber, means for at least temporarily separating said strip and said surface, a second conveyor positioned to receive the separated strip and means associated with said second conveyor for cutting said strip into blocks.

5. Apparatus as defined in claim 4 in which the means for cutting said strip comprises a knife and means for moving said knife in a path comprising a zone having a component transverse to the path of movement of the strip and a component concurrent with the movement of the strip and at the same rate followed by a zone having a component concurrent with the movement of the strip and at a greater rate.

6. Apparatus as defined in claim 4 in which the means for separating the strip from the supporting surface comprises means adjacent the discharge end of the first conveyor for diverting the path of the surface away from the path of the strip.

7. Apparatus as defined in claim 4 in which the means for separating the strip from the surface comprises means adjacent the discharge end of the first conveyor for diverting the surface away from the path of the strip as it leaves the first conveyor and for delivering the separated strip and surface to the second conveyor.

REGINALD TURNER.

References Cited in the file of this patent

UNITED STATES PATENTS

| Number | Name | Date |
|---|---|---|
| 852,560 | Igou | May 7, 1907 |
| 1,368,442 | Kuhn | Feb. 15, 1921 |
| 1,514,848 | Gantz | Nov. 11, 1924 |
| 1,692,427 | Urschel | Nov. 20, 1928 |
| 1,787,773 | Borchert | Jan. 6, 1931 |
| 1,810,740 | Vogt | June 16, 1931 |
| 1,893,672 | James et al. | Jan. 10, 1933 |
| 1,992,135 | Underwood | Feb. 19, 1935 |
| 2,188,418 | Routh | Jan. 30, 1940 |
| 2,214,325 | Gothe | Sept. 10, 1940 |
| 2,256,190 | Bowman | Sept. 16, 1941 |